(12) United States Patent  
Takeda

(10) Patent No.: US 8,819,355 B2  
(45) Date of Patent: Aug. 26, 2014

(54) INFORMATION PROCESSING APPARATUS, INFORMATION PROCESSING METHOD, AND PROGRAM

(75) Inventor: Shingo Takeda, Tokyo (JP)

(73) Assignee: NEC Corporation, Tokyo (JP)

( * ) Notice: Subject to any disclaimer, the term of this patent is extended or adjusted under 35 U.S.C. 154(b) by 130 days.

(21) Appl. No.: 13/514,792

(22) PCT Filed: Nov. 11, 2010

(86) PCT No.: PCT/JP2010/006628  
§ 371 (c)(1),  
(2), (4) Date: Jun. 8, 2012

(87) PCT Pub. No.: WO2011/070725  
PCT Pub. Date: Jun. 16, 2011

(65) Prior Publication Data  
US 2012/0254561 A1  Oct. 4, 2012

(30) Foreign Application Priority Data

Dec. 11, 2009  (JP) ................................ 2009-281931

(51) Int. Cl.  
*G06F 12/00* (2006.01)

(52) U.S. Cl.  
USPC ........................... 711/154; 711/114; 711/163

(58) Field of Classification Search  
None  
See application file for complete search history.

(56) References Cited

FOREIGN PATENT DOCUMENTS

| JP | 9-244984 A | 9/1997 |
|---|---|---|
| WO | 2008/43082 A2 | 4/2008 |

OTHER PUBLICATIONS

Lukasz Golab et al., "Stream Warehousing with DataDepot", SIGMOD'09 (Proceedings of the 35th SIGMOD International Conference on Management of Data), ACM 2009, pp. 847-853.  
International Search Report for PCT/JP2010/006628 dated Dec. 21, 2010.

*Primary Examiner* — Shawn X Gu  
(74) *Attorney, Agent, or Firm* — Sughrue Mion, PLLC

(57) ABSTRACT

An information processing apparatus includes: a storage unit having a plurality of storage areas which holds storage data including main body data and order data according to the writing order of the storage data, a receiving unit respectively receiving a plurality of reception data including the main body data and the order data, a comparing unit determining whether or not to write the reception data to the storage area on the basis of a result obtained by comparing the order data included in one or a plurality of storage data from the last in the storage area with the order data included in the reception data received by the receiving unit, and a writing unit writing the reception data to the storage area as the storage data in accordance with the determination made by the comparing unit.

33 Claims, 12 Drawing Sheets

INFORMATION PROCESSING APPARATUS, INFORMATION PROCESSING METHOD, AND PROGRAM

CROSS REFERENCE TO RELATED APPLICATIONS

This application is a National Stage of International Application No. PCT/JP2010/006628 filed Nov. 11, 2011, claiming priority based on Japanese Patent Application No. 2009-281931 filed Dec. 11, 2009, the contents of all of which are incorporated herein by reference in their entirety.

TECHNICAL FIELD

The present invention relates to an information processing apparatus, an information processing method, and a program.

BACKGROUND ART

Typical data handled in computers include time-series data. The time-series data are multiple records each including time information, and the time information is referred to as a time stamp. For example, in time-series data transmitted from a temperature sensor, each record may be constituted by a time stamp and temperature information. An example of record indicates that a temperature at "10:01:27 on Jul. 14, 2009" was "27.4 degrees Celsius". In this case, "10:01:27 on Jul. 14, 2009" represents the time stamp, and "27.4 degrees Celsius" represents main body data. There are many time-series data such as sales data of a POS terminal, position data given by a mobile unit having a GPS, load data of a computer, a log of a program, data given by an entrance/exit gate, and stock price data. The time-series data have such property that the time-series data are basically not updated except that incorrect information is corrected.

In many cases, the time-series data require processing in the order of the time stamp. However, when records of time-series data are successively received from a network, the records may not be necessarily received in the order of the time stamp. Because the order of the records may change due to a deviation of a clock at a transmitting source or due to a network delay. A time stamp of a record that could not be transmitted due to a failure and is retransmitted after recovery may be a time several days ago.

There is a limitation in the method for temporarily storing a received record to memory, sorting records in the memory, and then writing the records to a hard disk and the like in the order of the time stamp. For example, in the method described in Patent Document 1 (Japanese Laid-open patent publication NO. H09-244984), events are sorted in memory to correct the order within a range of the maximum delay time of a network.

For this reason, in general, Relational DataBase Management System (RDBMS) and the like are used to store the time-series data with indexes attached thereto. The index is meta information stored, separately from the record, in a hard disk and the like, and indicates the position in the hard disk and the like to which the record is written. When the indexes of the time stamps are generated as a B+ tree, the records can be read in the order of the time stamp without writing the records in the order of the time stamp. For example, Non-Patent Document 1 describes a system for analyzing, in an RDBMS, a large amount of time-series data generated by a communication system.

RELATED DOCUMENT

Patent Document

[Patent Document 1] Japanese Laid-open patent publication NO. H09-244984

Non-Patent Document

[Non-Patent Document 1] Lukasz Golab, et al, "Stream Warehousing with DataDepot", Proceedings of the 35th SIGMOD International Conference on Management of Data, 2009

SUMMARY OF THE INVENTION

However, when the technique of Patent Document 1 is used, it is impossible to cope with a case where there occurs deviation of the time stamp far beyond a normal network delay because of deviation of the clock, retransmission caused by failure, and the like. Alternatively, data in the memory may be lost because of power failure.

When data are written to the hard disk and the like with the indexes attached thereto as described in Non-Patent Document 1, two-step access, including writing a record and updating an index, to the hard disk and the like occurs. When data are read, two-step access, including reading an index and reading a record on the basis of the information, to the hard disk and the like occurs. The two-step access including seeking is a random access. Since the hard disk has such structure that data are read from a rotating magnetic disk with a magnetic head, sequential (successive) access is fast, but random access including seeking operation for moving the magnetic head is slow. Even in a semiconductor disk using NAND flash memory and the like, it is known that the sequential access is faster than the random access because of rewriting and caching in units of blocks. When the time-series data are written in the order of the time stamp, and the time-series data are processed in the order of the time stamp, the time-series data may be read at a high speed with the sequential access. More specifically, when Non-Patent Document 1 is used, the problem of the order of reception is solved, but the performance may be degraded in some cases.

It is an object of the present invention to provide an information processing apparatus, an information processing method, or a program which separately receives multiple data of which processing order is defined, and sorts the multiple data more quickly and accurately when the multiple data are held in the order in which the multiple data are received.

According to the present invention, an information processing apparatus is provided that includes a storage unit having a plurality of storage areas which respectively holds storage data including main body data and order data representing an order in which the main body data are processed, according to the writing order of the storage data, a receiving unit respectively receiving a plurality of reception data including the main body data and the order data, a comparing unit determining whether or not to write the reception data to one of the plurality of storage areas on the basis of a result obtained by comparing the order data included in one or a plurality of storage data from the last of the storage data held in the one of the plurality of storage areas with the order data included in the reception data received by the receiving unit, and a writing unit writing the reception data to the one of the plurality of storage areas as the storage data when the comparing unit determines that the reception data are to be written to the one of the plurality of storage areas.

In addition, according to the present invention, an information processing method is provided that includes a receiving step that respectively receives a plurality of storage data including main body data and order data representing an order in which the main body data are processed, a comparing step that determines whether or not to write the reception data to one of a plurality of storage areas, the plurality of storage areas respectively holding the storage data including the main body data and the order data according to the writing order of the storage data, on the basis of a result obtained by comparing the order data included in one or a plurality of storage data from the last of the storage data held in the one of the plurality of storage areas with the order data included in the reception data received by the receiving step, and a writing step that writes the reception data to the one of the plurality of storage areas as the storage data when the reception data are determined to be written to the one of the plurality of storage areas in the comparing step.

Further, according to the present invention, a program stored in a computer-readable recording medium is provided, the program causing the computer to execute a receiving processing that respectively receives a plurality of storage data including main body data and order data representing an order in which the main body data are processed, a comparing processing that determines whether or not to write the reception data to one of a plurality of storage areas, the plurality of storage areas respectively holding the storage data including the main body data and the order data according to the writing order of the storage data, on the basis of a result obtained by comparing the order data included in one or a plurality of storage data from the last of the storage data held in the one of the plurality of storage areas with the order data included in the reception data received by the receiving processing, and a writing processing that writes the reception data to the one of the plurality of storage areas as the storage data when the reception data are determined to be written to the one of the plurality of storage areas in the comparing processing.

According to the above invention, it is possible to provide the information processing apparatus, the information processing method, or the program that sorts multiple pieces of data quickly and accurately.

BRIEF DESCRIPTION OF THE DRAWINGS

The aforementioned objects and other objects, features, and advantages will be more apparent from the following preferred exemplary embodiments and the following drawings attached thereto.

DESCRIPTION OF EMBODIMENTS

Figure 1:
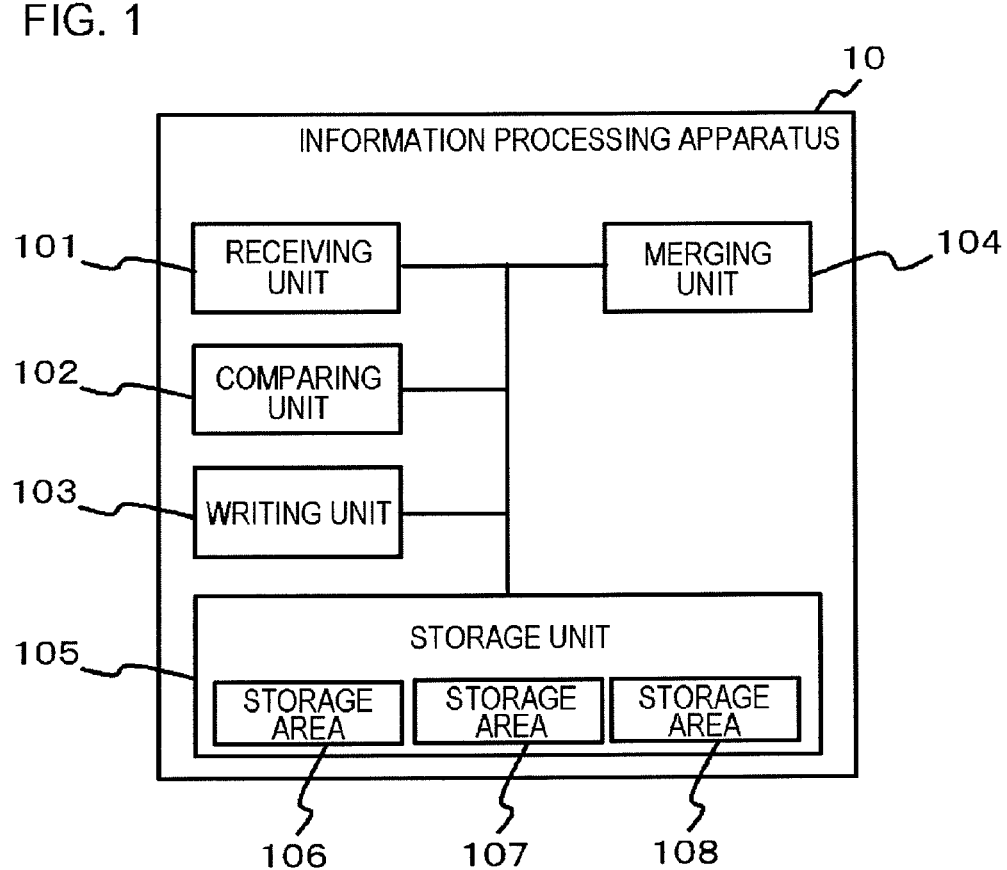
FIG. 1 is a block diagram illustrating a configuration of an information processing apparatus according to a first exemplary embodiment.

Exemplary embodiments of the present invention will be hereinafter explained with reference to drawings. In all the drawings, the same reference numerals are attached to the same constituent elements, and description is not repeated as necessary.

First Exemplary Embodiment

A first exemplary embodiment will be explained. A block diagram of the first exemplary embodiment is illustrated in FIG. 1. An information processing apparatus 10 as illustrated in FIG. 1 includes a receiving unit 101, a comparing unit 102, a writing unit 103, a merging unit 104, and a storage unit 105.

The storage unit 105 has multiple storage areas 106, 107, 108 which respectively hold the storage data in the order in which they have been written. The storage data held in the storage areas 106, 107, 108 includes main body data and order data indicating an order in which the main body data are processed. In this case, the order data may be time stamps of time-series data as explained above. For example, that can be applied to storage of packets having sequence numbers flowing in a network. In addition, for example, that can be applied to storage of product shipment data having serial numbers attached thereto. Alternatively, for example, a mode made a combination of some of or all of them may be employed.

The storage unit 105 is a medium to which data can be written and from which data can be read, such as a hard disk, semiconductor memory using NAND flash memory and DRAM, and a magneto-optical disk. In particular, the present invention is very effective for a medium of which sequential access performance is much higher than random access performance. Only one storage unit 105 is illustrated in the figure. However, there may be only one storage medium or multiple storage media. For example, hard disks and the like may be structured as a RAID.

The storage areas 106, 107, 108 are continuous areas reserved physically or logically in the storage unit 105. The storage areas 106, 107, 108 may be reserved physically in the storage unit 105, or may be reserved logically. The logically reserved storage areas 106, 107, 108 may be, for example, a virtual hard disk made by combining multiple hard disks with a RAID function, an abstract block device provided by an operating system (OS), and a file provided by a file system. The logically reserved storage areas 106, 107, 108 are not necessarily limited to areas which are completely, physically continuous, but are allocated so that an OS and a fragmentation-solving (defragmentation) program use an area which is as continuous as possible.

When the storage areas 106, 107, 108 are physically reserved, there is an advantage in that the processing speed can be improved by the sequential access. On the other hand, when the storage areas 106, 107, 108 are logically reserved, there is an advantage in that the processing of the present invention can be achieved with a relatively easy programming.

The receiving unit 101 separately receives multiple pieces of reception data including main body data and order data. The reception data are transmitted from a computer, a sensor, communication equipment, a portable telephone, a POS terminal, and the like, not illustrated, and may be transmitted via a network such as Local Area Network (LAN) and Wide Area Network (WAN). Alternatively, the receiving unit 101 may receive the reception data transmitted within the information processing apparatus 10 not through any network. It should be noted that the reception data may have a fixed length or a variable length, and may be in a binary format or in a text format.

The comparing unit 102 determines, through comparison and determination, in which of the multiple storage areas 106, 107 and 108 the reception data received by the receiving unit 101 are written. More specifically, first, the comparing unit 102 determines whether or not to write the reception data to the storage area 106 on the basis of a result obtained by comparing the order data included in one or multiple pieces of storage data from the last of the storage data held in the storage area 106 with the order data included in the reception data received by the receiving unit 101. The criterion for the determination is such that when the order data included in the reception data received by the receiving unit 101 indicates a priority lower than or equal to the highest priority of those indicated by the order data included in one or multiple pieces of storage data from the last of the storage data held in the storage area 106, it is determined that the reception data are written to the storage area 106.

If it is determined that the reception data are not written to the storage area 106, the comparing unit 102 determines whether or not to write the reception data to the storage area 107 on the basis of a result obtained by comparing the order data included in one or multiple pieces of storage data from the last of the storage data held in the storage area 107 with the order data included in the reception data. Further, when it is determined that the reception data are not written to the storage area 107, the comparing unit 102 determines whether or not to write the reception data to the storage area 108 on the basis of a result obtained by comparing the order data included in one or multiple pieces of storage data from the last of the storage data held in the storage area 108 with the order data included in the reception data.

It should be noted that the above comparison and determination in the comparing unit 102 is merely an example of the present invention, and the present invention is not limited to this method. For example, in FIG. 1, the storage unit 105 is illustrated as including three storage areas 106, 107, 108, but when there are more storage areas, the comparing unit 102 may perform the above comparison and determination on these storage areas. In the above explanation, the comparing unit 102 performs the comparison and determination on each one of the storage areas, but the comparing unit 102 may perform the comparison and determination on multiple storage areas at the same time.

Further, the order of the storage areas on which the comparing unit 102 performs the comparison and determination is not limited to the above order. When the multiple storage areas 106, 107, 108 are reserved in the same storage unit 105 like the present exemplary embodiment, and a storage area first subjected to the comparison and determination is specified, the storage data are unevenly concentrated on the storage area, which increases the sequential access and improves the performance. When each of the storage areas is reserved in a different storage medium, the parallel access to multiple storage media is improved and the performance is improved by additionally writing so as not to unevenness of the number of records by, for example, first, evenly distributing the storage areas which are subjected to the comparison and determination. That is, a method for selecting an appropriate destination of additional writing from among multiple storage areas satisfying a constrained condition is different according to physical configuration of a storage medium.

The writing unit 103 writes the reception data, as storage data, to the storage area 106 (or 107, 108) that is determined to be a destination of writing by the comparing unit 102.

The merging unit 104 reads the storage data from each of the storage areas 106, 107, 108 by the sequential access, and merges the read-out storage data on the basis of the order data included in the storage data. At this occasion, when the number of the storage areas from which the storage data are read out is small, reading by sequential access (sequential read) increases.

It should be noted that the merging unit 104 may transmit the merged storage data to another computer, storage device, display device, printing device, and the like, not illustrated, via a network, or the merged, storage data may be used for another processing in the information processing apparatus 10. The processing performed by the merging unit 104 to merge the storage data held in each of the storage areas 106, 107, 108 may be performed autonomously, or may be performed in heteronomously upon a request given from another device.

All or some of the configurations included in the information processing apparatus 10 may be implemented with hardware, or may be achieved with a program (or a program code) that causing a processor to execute processing. The processor reads the program from a recording medium such as nonvolatile memory and executes the program.

When the configurations included in the information processing apparatus 10 are carried out by the program, the program is stored in a storage medium that can be read by a processor (computer). The program causes the processor to execute a receiving processing for respectively receiving multiple pieces of reception data including the main body data and the order data indicating an order in which the main body data are processed. The program also causes the processor to execute a comparing processing for determining whether or not to write the reception data to one of the storage areas, the storage areas respectively holding the storage data including the main body data and the order data according to the writing order of the storage data, on the basis of a result obtained by comparing the order data included in one or multiple pieces of storage data from the last of the storage data held in the one of the storage areas with the order data included in the reception data received by the receiving processing. The program causes the processor to execute a writing processing for writing the reception data to the one of the storage areas as the storage data when the reception data are determined to be written to the one of the storage areas in the comparing processing.

Figure 2:
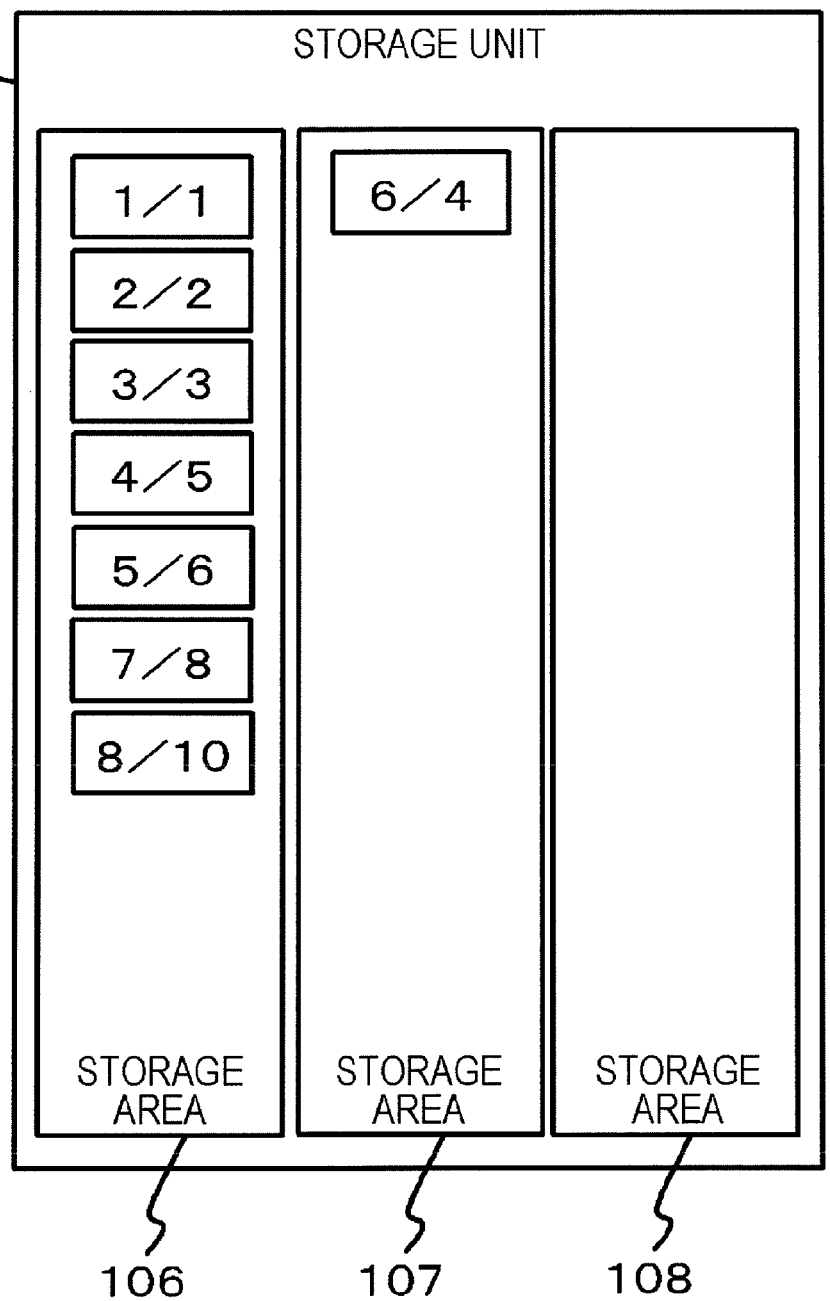
FIG. 2 is a figure illustrating an example of storage data stored in a storage unit according to the first exemplary embodiment.

An example of storage data stored in the storage unit 105 is illustrated in FIG. 2. Each rectangle included in the storage areas 106, 107, 108 as illustrated in FIG. 2 denotes storage data held in the storage areas 106, 107, 108. In each rectangle, a numerical value at the left hand side of a slash mark denotes a receiving order, and a numerical value at the right hand side thereof denotes a processing order indicated by the order data included in the storage data. It should be noted that both of the receiving order and the processing order are in the ascending order, in which the smaller the value is, the higher priority the value has, and the larger the value is, the lower priority the value has. Likewise, the order data used in the explanation below are also arranged to indicate that the smaller the value is, the higher priority the value has, and the larger the value is, the lower priority the value has.

Operation of the information processing apparatus 10 according to the present exemplary embodiment will be explained more specifically where the storage unit 105 is in a state as illustrated in FIG. 2 at a certain point in time. For example, in this state, it is assumed that the receiving unit 101 receives reception data indicating "priority of receiving order/priority of processing order=9/9".

At this occasion, the comparing unit 102 refers to one piece of storage data from the last in the storage area 106. The comparing unit 102 finds that the priority of the processing order of the storage data is "10", and the priority of the processing order of the reception data is higher than this one. Therefore, the comparing unit 102 determines not to write that the reception data to the storage area 106. Subsequently, the comparing unit 102 refers to one piece of storage data from the last in the storage area 107. The comparing unit 102 finds that the priority of the processing order of the storage data is "4", and the priority of the processing order of the reception data is lower than this one. Therefore, the comparing unit 102 determines to write the reception data to the storage area 107, and the writing unit 103 writes the reception data to the storage area 107.

Figure 3:
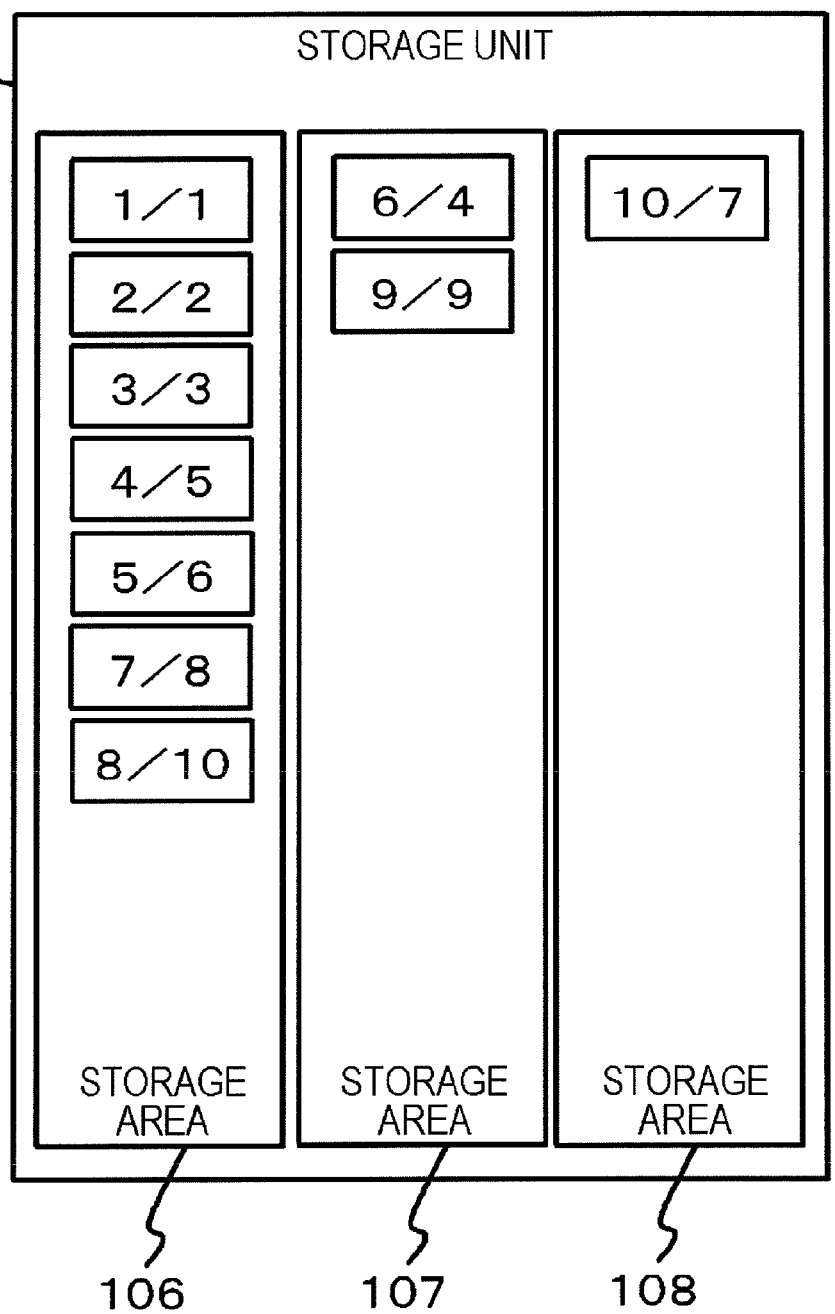
FIG. 3 is a figure illustrating an example of storage data stored in the storage unit according to the first exemplary embodiment.

When the comparing unit 102 refers to one piece of storage data from the last in each of the storage areas 106, 107, 108, and the storage data are additionally written to the storage area under the above condition, the storage data are stored in each of the storage areas according to the priority of the processing order as illustrated in FIG. 3, for example. In each of the storage areas, the storage data are arranged according to the priorities of the processing order, and therefore, the merging unit 104 can merge the storage data and can output the storage data according to the priorities of the processing order.

In the above explanation, the comparing unit 102 refers to one piece of storage data from the last in each of the storage areas 106 and 107. Alternatively, the comparing unit 102 may refers to multiple pieces of storage data from the last. In other words, when the comparing unit 102 refers to two pieces of storage data from the last in the storage area 106, the comparing unit 102 finds that the priorities of the processing order of the storage data are "8" and "10". Among these priorities of the processing order, the higher priority is "8", and when this is employed as a reference, the priority of the processing order of the reception data is lower than this. Therefore, the comparing unit 102 determines to write the reception data to the storage area 106, and the writing unit 103 writes the reception data to the storage area 106.

Figure 4:
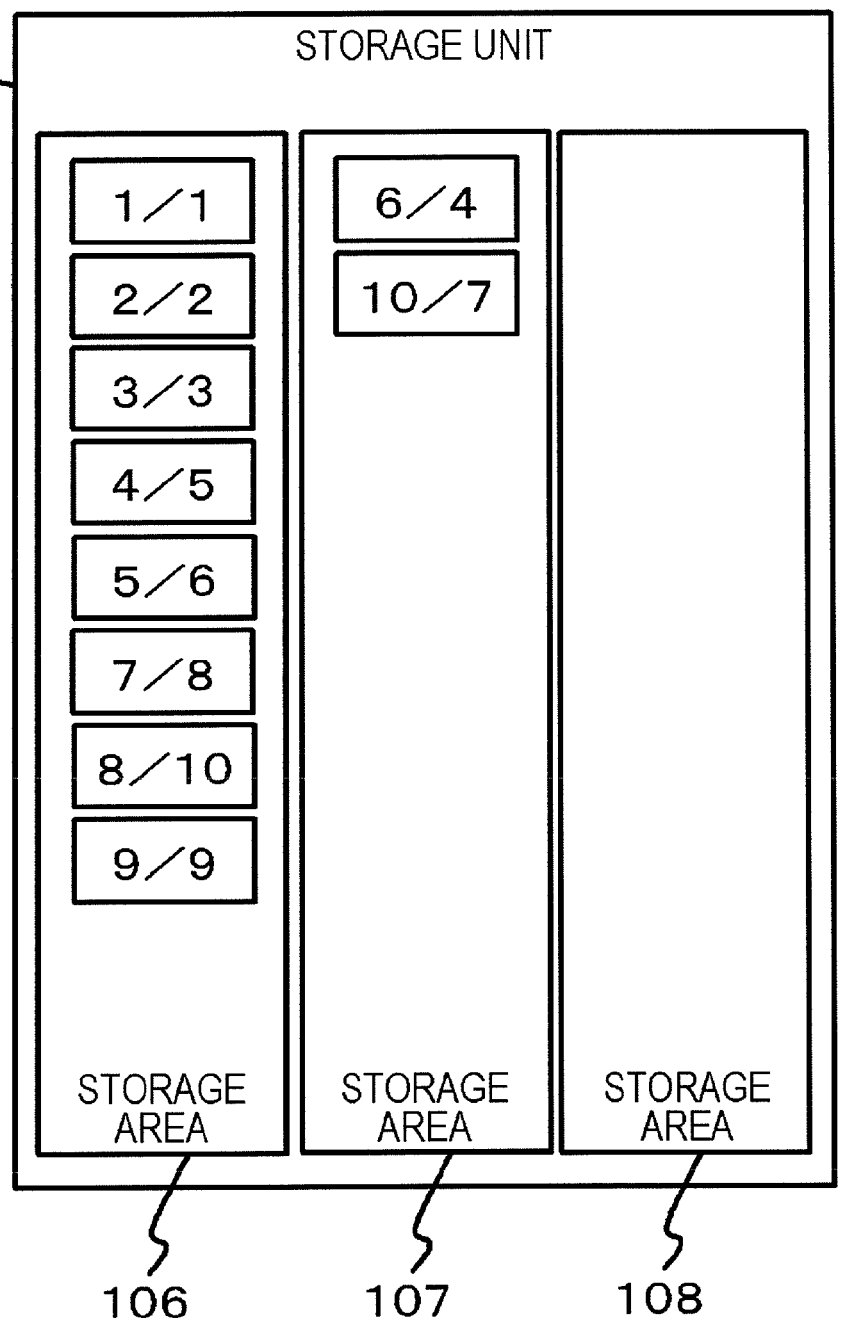
FIG. 4 is a figure illustrating an example of storage data stored in the storage unit according to the first exemplary embodiment.

When the comparing unit 102 refers to two pieces of storage data from the last in each of the storage areas 106, 107, 108, and the storage data are additionally written to the storage area under the above condition, the reception data written to the storage areas 106, 107, 108 are generally according to the priority of the processing order as illustrated in FIG. 4, for example, but some may be written not in accordance with the priorities of the processing order.

In the explanation about this case, for example, the storage data and the reception data all of which indicate different priorities of the processing order are subjected to the comparison and determination. Alternatively, storage data and reception data which indicate the same priority of the order may be subjected to the comparison and determination. In this case, the comparing unit 102 determines to write the reception data to the storage area.

Figure 5:
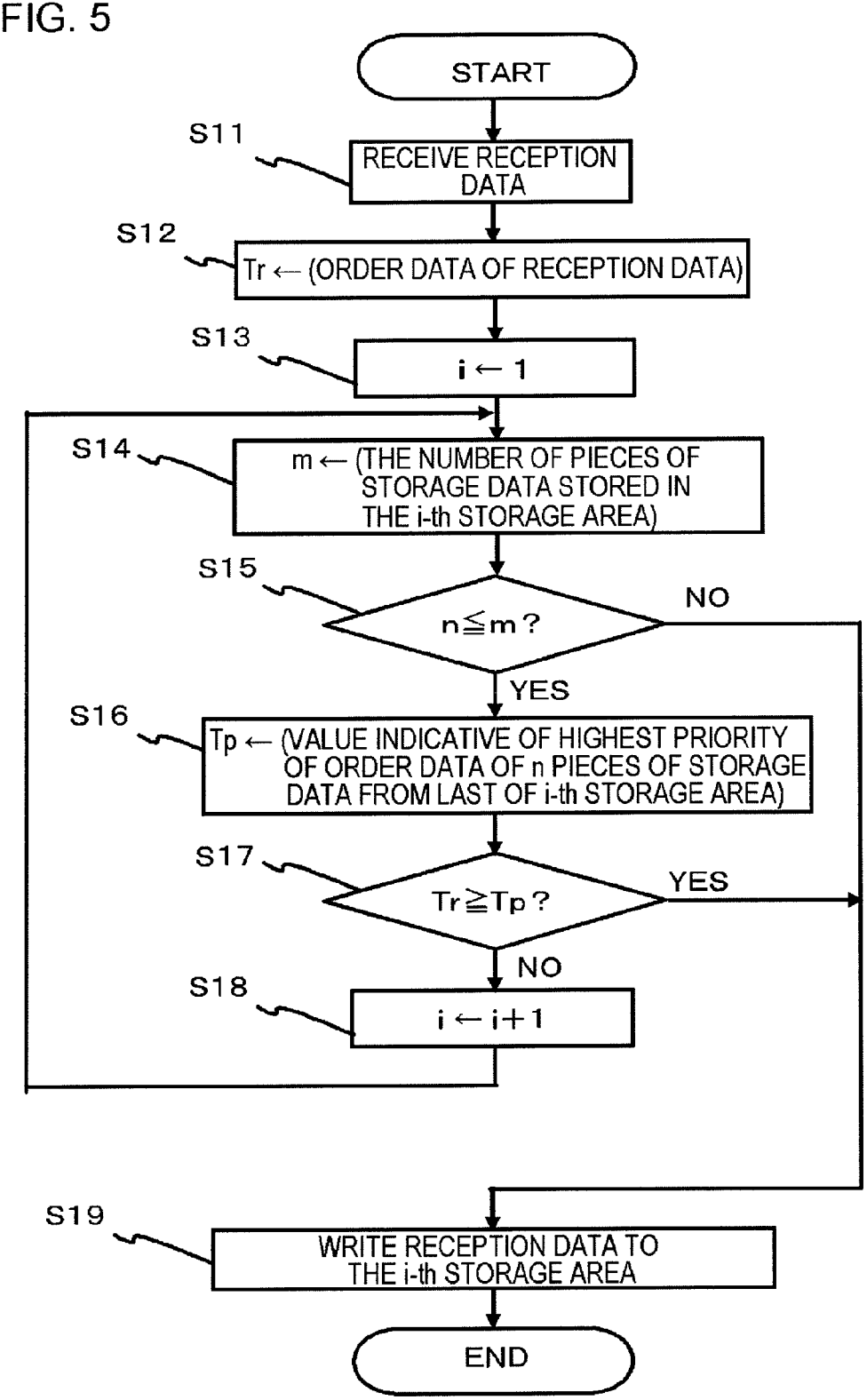
FIG. 5 is a flowchart illustrating write operation of reception data according to the first exemplary embodiment.

As described above, the destination to which the reception data are written is changed in accordance with the number of pieces of storage data used by the comparing unit 102 for the comparison and determination of one storage area. Where the number of pieces of storage data used by the comparison unit 102 for the comparison and determination of each of the storage areas 106, 107, 108 is n (integer equal to or more than 1), the operation of the information processing apparatus 10 up to writing of the reception data to the storage unit 105 can be expressed as illustrated in the flowchart of FIG. 5.

First, the receiving unit 101 respectively receives multiple pieces of reception data (step S11). Subsequently, the comparing unit 102 substitutes the order data included in the reception data into a variable Tr (step S12). Then, the comparing unit 102 substitutes 1 into a loop variable i (step S13), and substitutes the number of pieces of storage data stored in the i-th storage area (any one of the storage areas 106, 107, 108) into m (step S14), and when n is equal to or less than m (YES in step S15), a value representing the highest priority of the order data among the order data included in the (m−n+1)-th to the m-th storage data (n pieces of storage data from the last) in the i-th storage area is substituted into a variable Tp (step S16). When Tr is less than Tp (NO in step S17), one is added to the loop variable i in order to search a subsequent storage area (step S18), and then step S14 is performed. When n is more than m (NO in step S15), or when Tr is equal to or more than Tp (YES in step S17), the comparing unit 102 determines the i-th storage area as a destination to which the reception data are written, and the writing unit 103 writes the reception data to the i-th storage area as the storage data (step S19).

Figure 6:
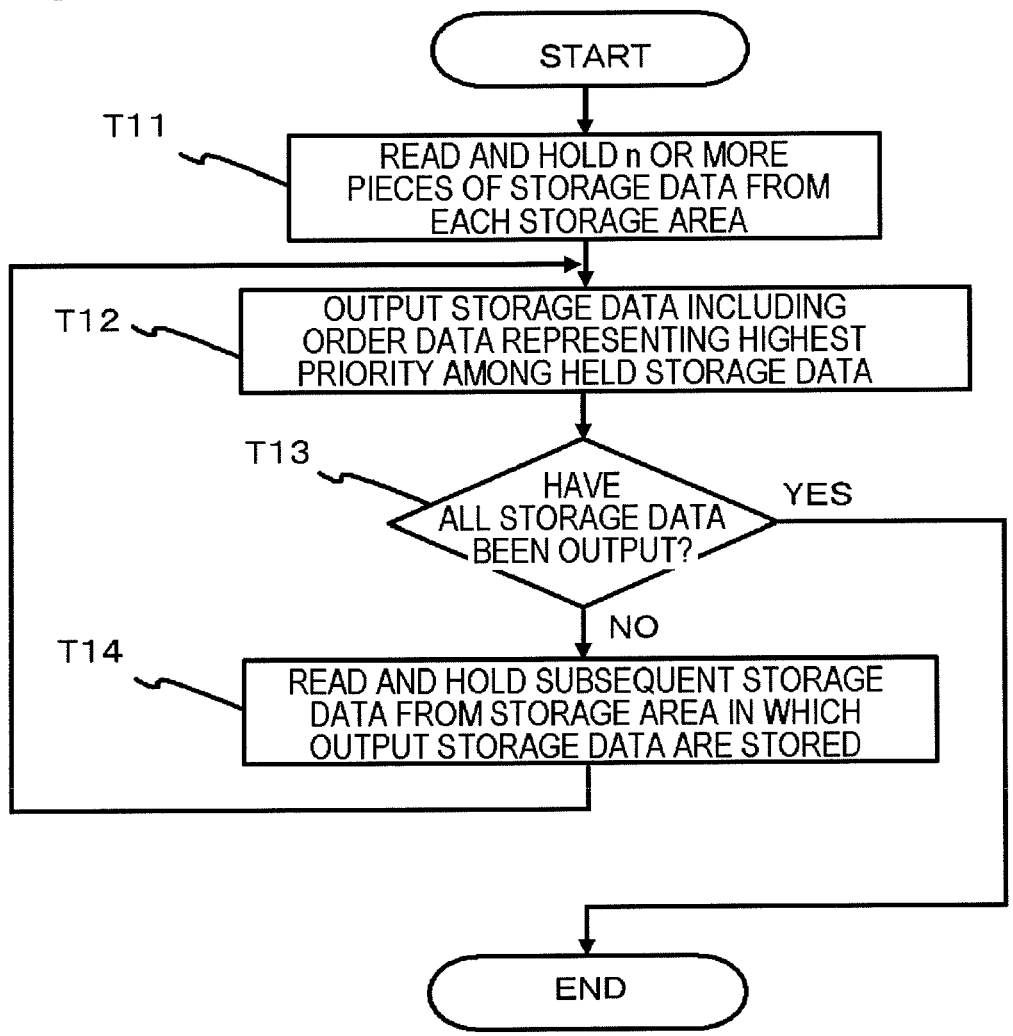
FIG. 6 is a flowchart illustrating operation for merging storage data according to the first exemplary embodiment.

With the above processing, the storage data written to the storage areas 106, 107, 108 are merged by the merging unit 104 according to the procedure as illustrated in the flowchart of FIG. 6. First, the merging unit 104 reads n or more pieces of storage data from each of the storage areas 106, 107, 108, and holds the storage data (step T11). However, in step T11, it is not necessary to read any storage data from a storage area including no storage data written thereto. Then, the merging unit 104 outputs storage data having order data representing the highest priority among the multiple pieces of storage data held in step T11 (step T12). The merging unit 104 determines whether all the storage data held in the storage areas 106, 107, 108 have been output or not, and when all the storage data have been output (YES in step T13), the processing is terminated. When all the storage data have not yet been output (NO in step T13), storage data subsequent to the head of the storage area, in which the storage data output in step T12 are stored, are read, and the storage data are held (step T14). Then, step T12 is performed. However, when the storage area has no storage data remaining therein in step T14, step T12 may be performed subsequently without reading any storage data.

The above processing of the merging unit 104 can use priority queue of which length is n or more. The data put into the priority queue can be retrieved in a sorted state. In other words, the storage data put in random order can be retrieved according to a priority indicative of the order data. The priority queue is widely used by a person skilled in the art, and many of the implementations are open to the public. Therefore, explanation of the method for achieving the priority queue is not repeated. When, during the comparison and determination performed by the comparing unit 102, the number of pieces of storage data referred to by the storage area 106 (or 107, 108) is increased, and further, the length of the priority queue is increased accordingly, the number of used storage areas decreases, but the amount of memory used by the priority queue increases.

With the operation as described above, the information processing apparatus 10 according to the present exemplary embodiment can merge and output reception data of which priorities indicative of the receiving order and the processing order are different, but this is based on the assumption that the storage areas 106, 107, 108 prepared in advance can sufficiently perform the series of processing. However, when the comparing unit 102 determines not to write the reception data to any one of the storage areas 106, 107, 108 prepared in advance, and the storage unit 105 has a function of adding a new storage area, the writing unit 103 can write the reception data to the new storage area added by this function.

In the explanation about the present exemplary embodiment, for the sake of simplicity of explanation, there is only one piece of order data. However, the present invention can also be applied even when there are two or more kinds of order data. For example, two kinds of time stamps, i.e., a start time and an end time, of a certain phenomenon may be attached to main body data. When there are multiple types of order data, the merging unit 104 desirably merges all types of order data according to the order in each of the storage areas. When storage data are written to each of the storage areas like the present exemplary embodiment, the merging unit 104 can merge the storage data on the basis of each of multiple types of order data.

Now, the advantageous effects of the first exemplary embodiment will be explained. In the present exemplary embodiment, data are written to each of the storage areas 106, 107, 108 in accordance with the order matching the constraint condition of the comparison and determination, and therefore, the order in which the data are stored in each of the storage areas matches the processing order to some extent. Therefore, the merging unit 104 can merge the data by sequential access, which allows fast merging process.

In the present exemplary embodiment, the constraint condition of the comparison and determination can be changed by adjusting the number n, which is the number of pieces of storage data used for the comparison and determination in each of the storage areas 106, 107, 108. When the number of used storage areas is decreased, the value of n may be increased, and when it is desirable to achieve a high degree of coincidence between the order from the head of the each of the storage areas and the processing order of the storage data, the value of n may be increased.

Second Exemplary Embodiment

Figure 7:
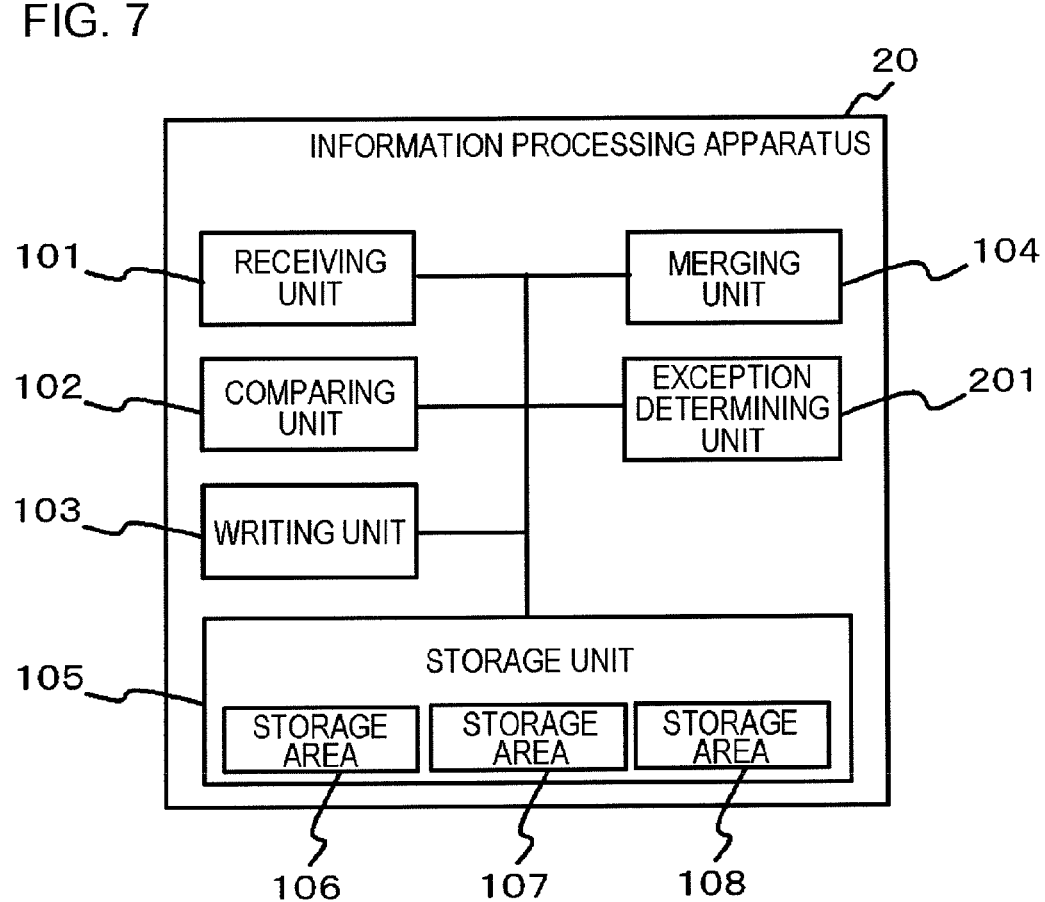
FIG. 7 is a block diagram illustrating a configuration of an information processing apparatus according to a second exemplary embodiment.

A second exemplary embodiment will be explained. A block diagram of the second exemplary embodiment is illustrated in FIG. 7. As illustrated in FIG. 7, an information processing apparatus 20 according to the second embodiment is different from the first embodiment in that the information processing apparatus 20 has an exception determining unit 201 for determining whether or not reception data received by the receiving unit 101 match an exception criterion defined in advance. It should be noted that the same elements as those of the first embodiment are denoted with the same reference numerals as the first embodiment, and detailed description thereabout is not repeated.

In the present embodiment, a comparing unit 102 performs comparison and determination using reception data which are determined not to suit by the exception determining unit 201, and a writing unit 103 writes the reception data to any one of storage areas 106, 107, 108 in accordance with the result of the comparison and determination of the comparing unit 102.

In this case, the exception criterion is different according to the property of the system. For example, in a system in which the order data (time stamp) are usually within 10 minutes from the current time, reception data having order data which is different from the current time by 10 minutes or more can be treated as an exception. Alternatively, comparison may be made with the order data included in the storage data written to a storage unit 105. Further, a case where main body data and order data included in the order data are illegal values may be treated as an exception.

The reception data determined to be an exception by the exception determining unit 201 may be discarded, or a storage area dedicated for writing reception data determined to be an exception may be prepared in the storage unit 105, and the reception data may be written to the storage area. For example, when RDBMS is used, the storage data can be written regardless of the priority of the order data, and the storage data can be read according to the priority of the order data. When the storage data are read according to the priority of the order data, the storage data can be merged by a merging unit 104.

When the writing unit 103 fails writing the reception data, the exception determining unit 201 may determine that the reception data are exceptions. For example, when the writing unit 103 notifies the exception determining unit 201 of the failure to write the reception data because there is not storage area satisfying the constraint condition, the exception determining unit 201 may determine that the reception data are exceptions.

In the second exemplary embodiment, exceptional data can be prevented from being stored to the storage areas 106, 107, 108. When taking an approach for adding a new storage area when the comparing unit 102 determines that data can be written to none of the storage areas 106, 107, 108 prepared in advance, this approach can prevent addition of unnecessary storage area in order to write exceptional data, and can prevent reduction of the processing speed in the writing unit 103 or the merging unit 104.

Third Exemplary Embodiment

Figure 8:
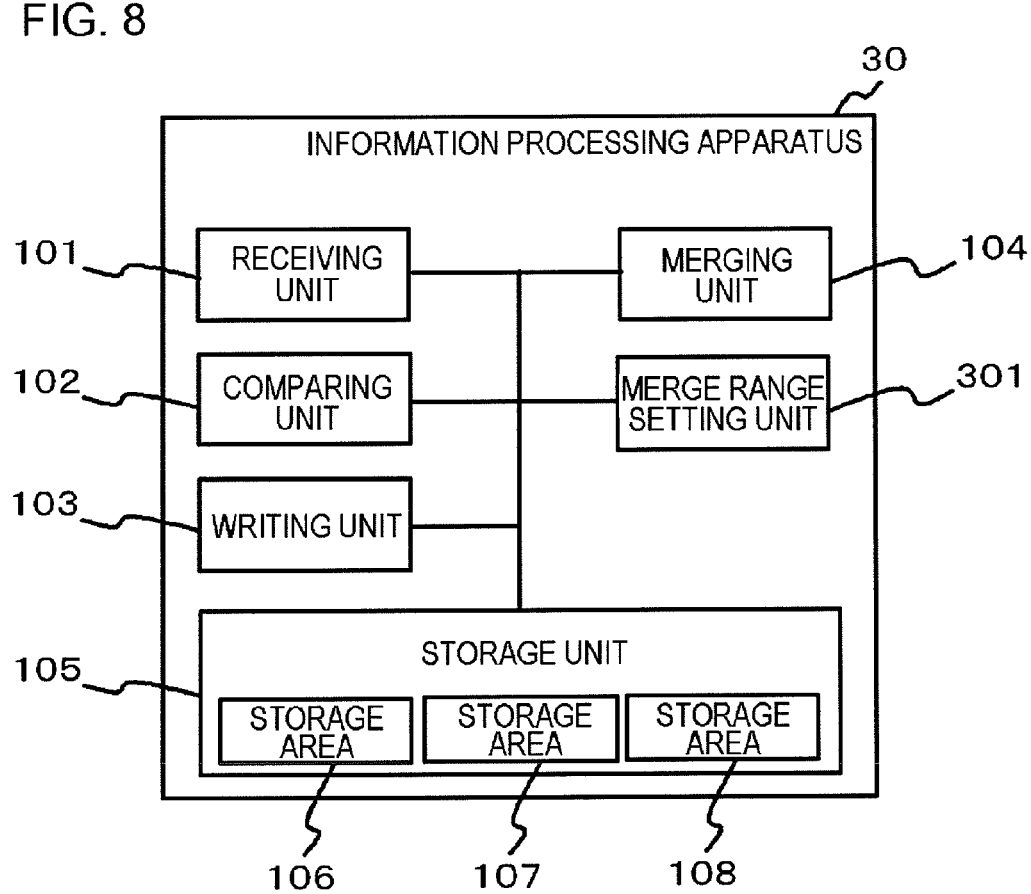
FIG. 8 is a block diagram illustrating a configuration of an information processing apparatus according to a third exemplary embodiment.

A third exemplary embodiment will be explained. A block diagram of the third exemplary embodiment is illustrated in FIG. 8. As illustrated in FIG. 8, an information processing apparatus 30 according to the third exemplary embodiment is different from the first exemplary embodiment in that the information processing apparatus 30 has a merge range setting unit 301 that sets at least one of a start value, i.e., a value indicative of the highest priority of the order data, or an end value, i.e., a value indicative of the lowest priority of the order data, among the order data included in storage data which are to be merged by a merging unit 104. It should be noted that the same elements as those of the first exemplary embodiment are denoted with the same reference numerals as the first exemplary embodiment, and detailed description thereabout is not repeated.

In the present exemplary embodiment, the merging unit 104 determines a start position or an end position from which storage data are read from a storage area 106 (or 107, 108) on the basis of the end value or the start value set by the merge range setting unit 301, and reads storage data from the start position to the end position thus set.

When the order data are time stamps, and the storage data including a time stamp of 2008 is read out, the merge range setting unit 301 sets the start value as "00:00:00 on Jan. 1, 2008", and sets the end value as "23:59:59 on Dec. 31, 2008". For example, when a record of 2009 or later is read out, the merge range setting unit 301 sets the start value as "00:00:00 on Jan. 1, 2009", and does not set the end value. Binary search can be applied in order to efficiently determine the range of records to be read out. However, when the number of pieces of storage data n used in comparison and determination is an integer equal to or more than 2, some of the storage data written to the storage areas 106, 107, 108 may be written not in accordance with the processing order, and it is desired to take that into consideration. An example of binary search applicable to the present exemplary embodiment will be hereinafter explained.

Figure 9:
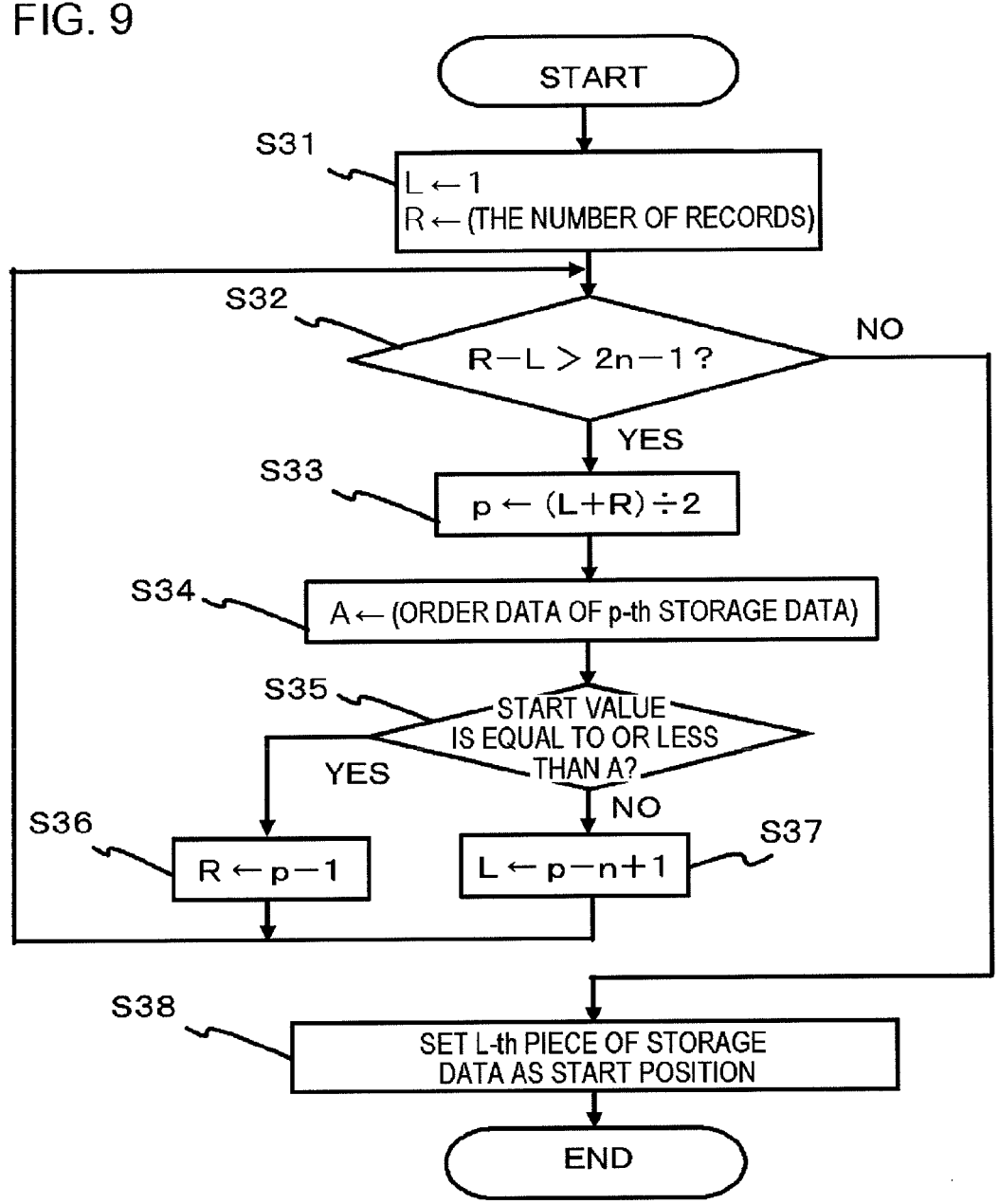
FIG. 9 is a flowchart illustrating operation of determining a reading start position according to the third exemplary embodiment.

FIG. 9 is a flowchart illustrating operation of determining a reading start position. In the explanation below, a variable L indicates that it is not required to read storage data before the variable L, and a variable R indicates that it is required to read storage data after the variable R. In other words, this indicates that the storage data from the variable L to the variable R are to be read out or unknown, and are included in a search range. First, 1 is substituted into the variable L, and the number of pieces of storage data stored in the storage area is substituted into the variable R, so that the variables are initialized (step S31). An inequality sign, R−L>2n−1, is evaluated, and when this inequality holds (YES in step S32), (L+R)/2 is substituted into a variable p to determine a search position (step S33). Order data included in the p-th (center of the search range) storage data are substituted into a variable A (step S34).

The start value set by the merge range setting unit 301 is compared with A substituted thereinto in step S34, and when the start value is equal to or less than A (YES in step S35), it is required to read the p-th and subsequent storage data, and therefore, p−1 is substituted into the variable R, and step S32 is subsequently performed again (step S36). When the start value is more than A (NO in step S35), it is not required to read the storage data before the (p−n+1)-th storage data, and accordingly, p−n+1 is substituted into the variable L, and step S32 is subsequently performed again (step S37).

The inequality sign, R−L>2n−1, is evaluated, and when this inequality does not hold, i.e., when the number of pieces of storage data included in the search range gets down to 2n−1 or less (NO in step S32), the L-th piece of storage data are set as a reading start position (step S38).

Figure 10:
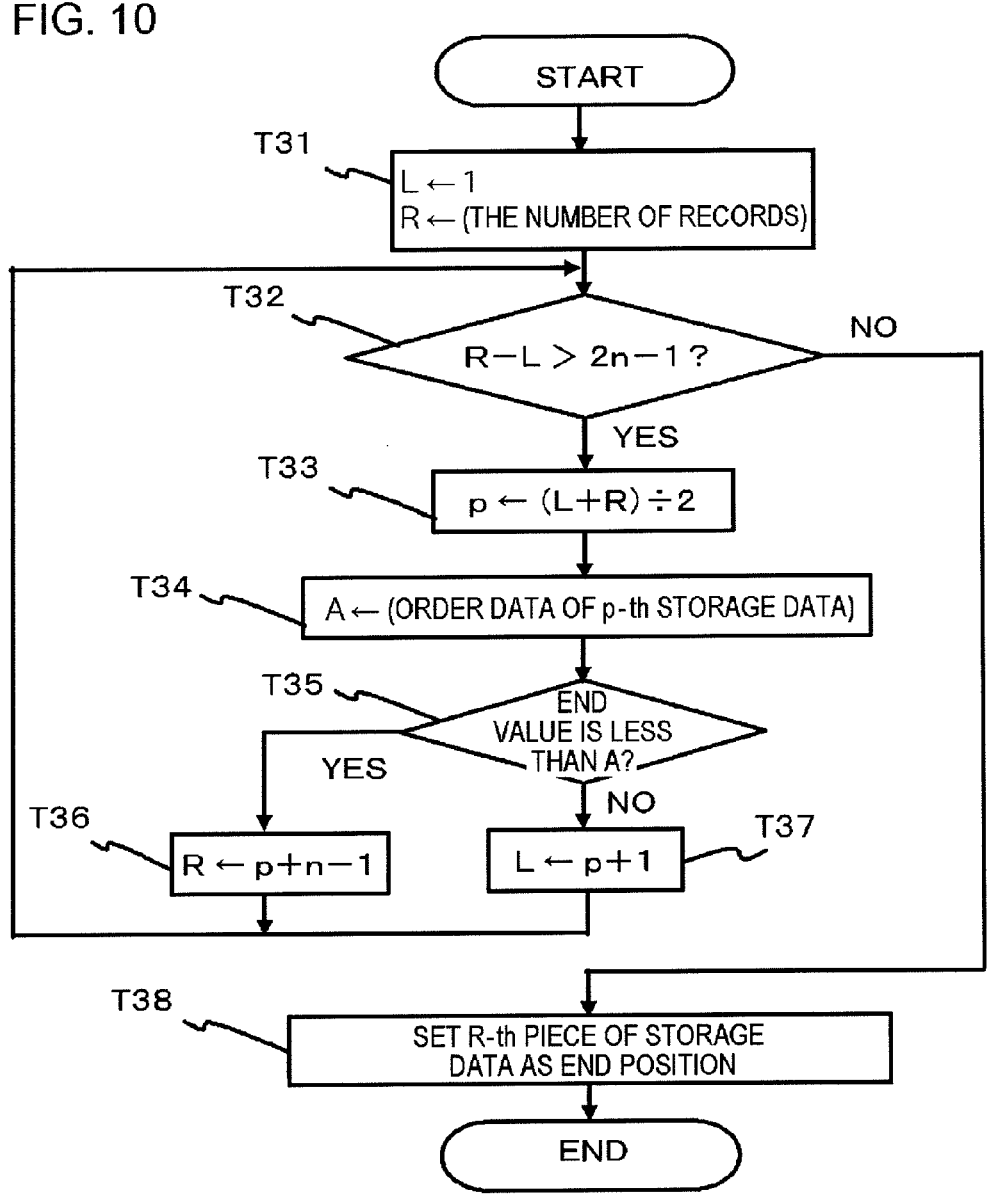
FIG. 10 is a flowchart illustrating operation of determining a reading end position according to the third exemplary embodiment.

FIG. 10 is a flowchart illustrating operation of determining a reading end position. In the explanation below, a variable L indicates that it is not required to read storage data before the variable L, and a variable R indicates that it is required to read storage data after the variable R. This indicates that the storage data from the variable L to the variable R are read out or unknown, and are included in a search range. First, 1 is substituted into the variable L, and the number of pieces of storage data stored in the storage area is substituted into the variable R, so that the variables are initialized (step T31). An inequality sign, R−L>2n−1, is evaluated, and when this inequality holds (YES in step T32), (L+R)/2 is substituted into a variable p to determine a search position (step T33). Order data included in the p-th (center of the search range) storage data are substituted into a variable A (step T34).

The end value set by the merge range setting unit 301 is compared with A substituted thereinto in step T34, and when the end value is equal to or less than A (YES in step T35), it is not required to read the (p+n−1)-th and subsequent storage data, and therefore, p+n−1 is substituted into the variable R, and step T32 is subsequently performed again (step T36).

When the end value is equal to or more than A (NO in step T35), it is required to read the p-th and prior storage data, and accordingly, p+1 is substituted into the variable L, and step T32 is subsequently performed again (step T37).

The inequality sign, R−L>2n−1, is evaluated, and when this inequality does not hold, i.e., when the number of pieces of storage data included in the search range gets down to 2n−1 or less (NO in step T32), the R-th piece of storage data are set as a reading end position (step T38).

The storage data in the range determined in the example as illustrated in FIGS. 9 and 10 may include storage data having order data outside of the specified range. Therefore, the order data are searched, and the storage data outside of the range may be disregarded so that they are not transmitted.

According to third exemplary embodiment, part of the storage data written to the storage areas 106, 107, 108 can be specified and merged.

Fourth Exemplary Embodiment

Figure 11:
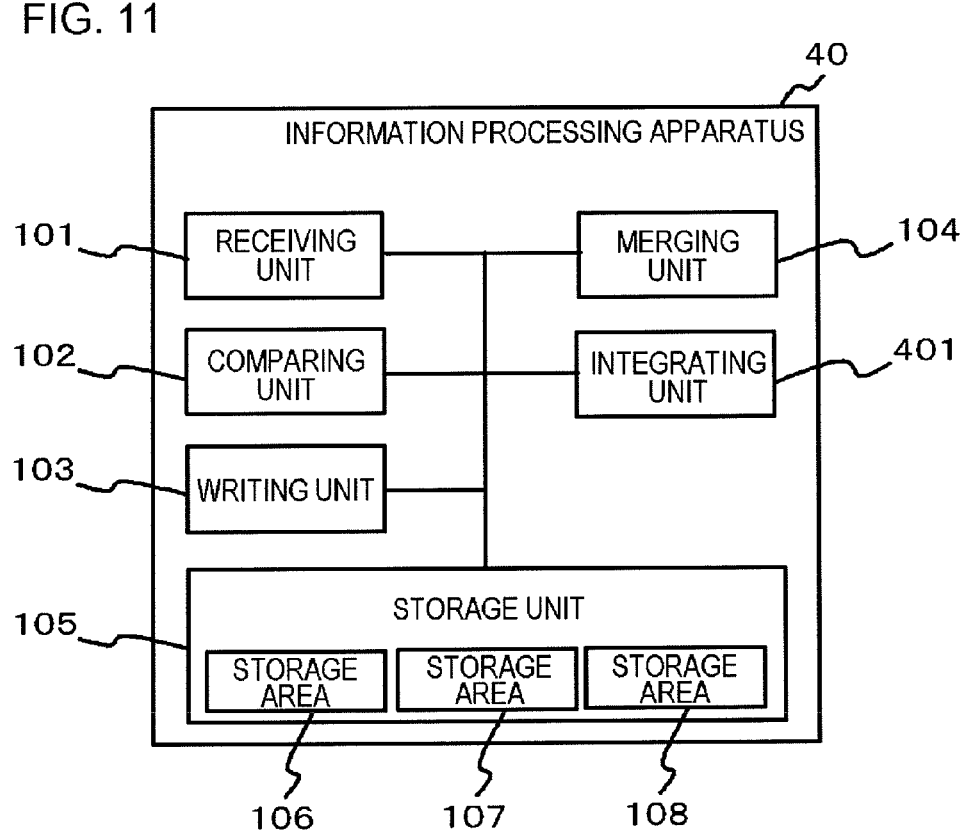
FIG. 11 is a block diagram illustrating a configuration of an information processing apparatus according to a fourth exemplary embodiment.

A fourth exemplary embodiment will be explained. A block diagram of the fourth exemplary embodiment is illustrated in FIG. 11. As illustrated in FIG. 11, an information processing apparatus 40 according to the fourth exemplary embodiment is different from the first exemplary embodiment in that the information processing apparatus 40 has an integrating unit 401, wherein when there are multiple small storage areas holding storage data less than or equal to a predetermined number, the integrating unit 401 reads storage data held in the multiple small storage areas, sorts the read storage data in accordance with order data included in the read storage data, and writes the sorted storage data to another storage area. It should be noted that the same elements as those of the first exemplary embodiment are denoted with the same reference numerals as the first exemplary embodiment, and detailed description thereabout is not repeated.

In the fourth exemplary embodiment, the number of small storage areas is decreased with a regular interval or continuously. When the number of small storage areas, in which a fewer number of pieces of storage data are stored, increases, the ratio of random access increases, which reduces the processing speed of writing or reading. The number of small storage areas increases when many storage data having exceptional order data arrive.

The integrating unit 401 integrates storage data stored in two or more small storage areas, thereby moving them to a fewer number of storage areas. For example, all storage data stored in two small storage areas are respectively read out and sorted according to the order in the order data, the sorted storage data are written to one storage area, and all the storage data stored in the original small storage areas are erased. In this example, the number of used storage areas decreases by one.

Figure 12:
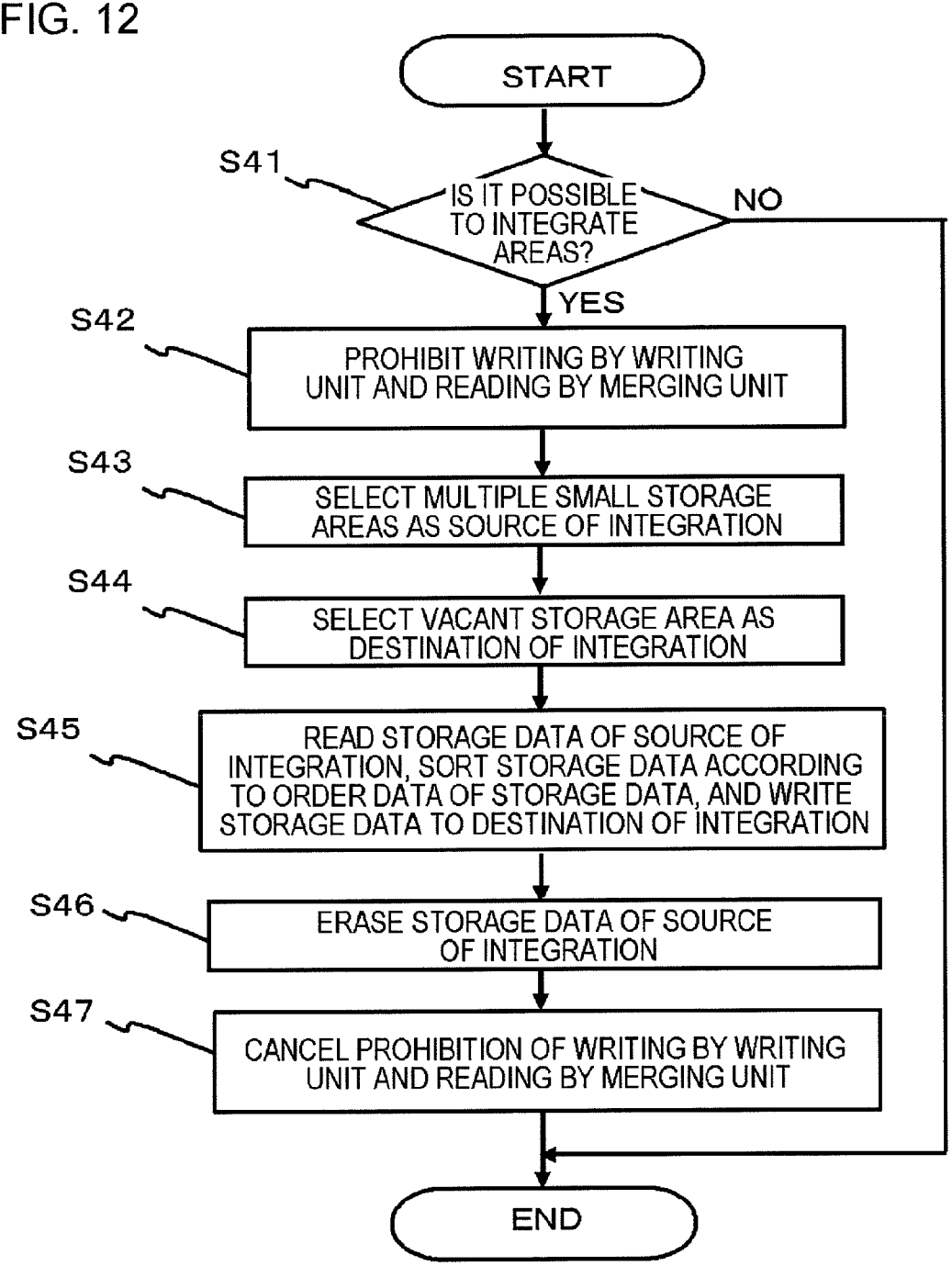
FIG. 12 is a flowchart illustrating an example of operation of an integrating unit according to the fourth exemplary embodiment.

FIG. 12 is a flowchart illustrating an example of operation of the integrating unit 401. First, the integrating unit 401 determines whether currently the integration can be performed (step S41). More specifically, a determination is made as to whether there are two or more small storage areas in which there are a fewer number of pieces of storage data, whether there is one or more vacant storage area, and whether no problem is caused by prohibiting writing and reading. When the integration cannot be performed, the operation is terminated. When the integration can be performed, writing by a writing unit 103 and reading by a merging unit 104 are temporarily prohibited in order to prevent occurrence of inconsistency (step S42). Subsequently, multiple small storage areas in which there are a fewer number of pieces of storage data are selected as a source of integration (step S43). In addition, one vacant storage area is selected as a destination of integration (step S44). Then, the integrating unit 401 reads the storage data from the source of integration, sorts the read storage data in accordance with order data included in the read storage data, and writes the sorted storage data to the destination of integration (step S45). After all the storage data have been written, the integrating unit 401 erases all the storage data in the source of integration to make the source of integration vacant (step S46). Finally, prohibition of writing by the writing unit 103 and reading by the merging unit 104 are cancelled (step S47). With the above operation, the number of vacant storage area increases by one. The above operation is executed with a regular interval or continuously.

FIG. 12 shows the example where the vacant storage areas are set as the destination of integration. However, when all the storage data to be integrated fit in the memory, the destination of integration and the source of integration may be the same storage area. When the destination of integration and the source of integration are the same storage area, the integrated storage data are temporarily saved in the memory and written to the destination of integration. However, in this case, when a failure such as power failure occurs while writing to the destination of integration, the storage data may be destroyed.

According to the fourth exemplary embodiment, the number of small storage areas is decreased with a regular interval or continuously, so that this can prevent reduction of the processing speed of writing or reading.

The exemplary embodiments have been hereinabove explained. According to the exemplary embodiments, the storage data which are not guaranteed to be received according to the priority indicated by the order data can be written at a fast speed, and the storage data can be read according to the priority indicated by the order data at a fast speed. More commonly, a data string which includes information about processing order and which is not guaranteed to be received according to the processing order can be written at a fast speed, and the data string can be read according to the processing order at a fast speed.

The exemplary embodiments of the present invention have been hereinabove explained with reference to drawings. However, they are merely examples of the present invention, and various configurations other than the above can also be employed.

For example, in the explanation about the above exemplary embodiments, the reception data received by the receiving unit 101 are immediately processed by the comparing unit 102. However, a function may be provided to temporarily hold the reception data received by the receiving unit 101 before the reception data are transmitted to the comparing unit 102, and sort the reception data intermittently on the basis of the order data included in the held reception data. Then, the comparing unit 102 may use the reception data sorted by this function. It should be noted that this function may sort the reception data with a predetermined interval of time, or may sort the reception data when a predetermined amount of reception data are held. In this case, the order of writing is more similar to the priority indicated by the order data, and therefore, the number of required storage areas decreases. In this case, "intermittently" means that a sufficiently longer interval is ensured than an interval with which the receiving unit 101 receives the reception data.

In the explanation about the above exemplary embodiments, for example, the writing unit 103 writes the main body data as well as the order data to the same storage area. Alternatively, the main body data and the order data may be written to separate storage areas. At this occasion, after the merging unit 104 merges the order data, the main body data are sorted in the same order as the order data, so that the storage data can be merged. When only the order data are stored to the storage area, this increases the efficiency of specifying of the range in the binary search explained in the third exemplary embodiment. Alternatively, the main body data may be written to separate storage areas according to items, and in this case, the efficiency of reading only one item can be enhanced. According to the purposes, the same item of the main body data and the order data may be written to multiple storage areas.

In the explanation about the above exemplary embodiments, the explanation has been made based on the assumption that the merging unit 104 is provided. However, the merging unit 104 may not be necessarily provided in the same apparatus. In other words, the storage data written as explained in the above exemplary embodiments may be merged after they are transferred to another apparatus.

In the explanation about the above exemplary embodiments, multiple flowcharts are used, and each of the flowcharts describes multiple steps. However, the order in the description is not intended to limit the order in which the steps of the information processing method according to the present invention are executed. Therefore, when the information processing method according to the present invention is executed, the order of the multiple steps may be changed within the scope that does not cause any trouble in terms of contents.

It is to be understood that the above exemplary embodiments and the multiple modifications can be combined as long as the contents thereof are not contradictory to each other. In the above exemplary embodiments and the modifications, the function of each constituent element and the like have been explained specifically. However, the functions can be changed in various manners within the scope that satisfies the invention of the present application.

This application claims the priority based on Japanese Patent Application No. 2009-281931 filed on Dec. 11, 2009, and all the disclosures thereof are incorporated herein by reference.

The invention claimed is:

1. An information processing apparatus comprising:
   a storage unit having a plurality of storage areas which respectively holds storage data each including main body data and order data representing an order in which the main body data is processed, according to writing order of each storage data;
   a receiving unit receiving reception data including main body data and order data;
   a comparing unit determining whether or not to write the reception data to one of the plurality of storage areas on the basis of a result obtained by comparing the order data included in a last of the storage data held in the one of the plurality of storage areas with the order data included in the reception data received by the receiving unit; and
   a writing unit writing the reception data to the one of the plurality of storage areas as storage data when the comparing unit determines that the reception data are to be written to the one of the plurality of storage areas.

2. The information processing apparatus according to claim 1, wherein when the order data included in the reception data received by the receiving unit indicates a priority lower than or equal to a highest priority of those indicated by order data included in a plurality of storage data from the last of the storage data held in the one of the plurality of storage areas, the comparing unit determines to write the reception data to the one of the plurality of storage areas.

3. The information processing apparatus according to claim 1, wherein when the comparing unit determines not to write the reception data to the one of the plurality of storage areas, the comparing unit determines, on the basis of a result obtained by comparing order data included in the last of the storage data held in another storage area with the order data included in the reception data, whether or not to write the reception data to said another storage area.

4. The information processing apparatus according to claim 1 further comprising
a storage area adding unit that adds a new storage area to the storage unit when the comparing unit determines to write the reception data to none of the plurality of storage areas,
wherein the writing unit writes the reception data to the new storage area added by the storage area adding unit.

5. The information processing apparatus according to claim 1 further comprising
a merging unit that reads the storage data from each of the plurality of storage areas by sequential access, and merges the storage data in each of the plurality of storage areas on the basis of the order data included in each of the read storage data.

6. The information processing apparatus according to claim 5, wherein the merging unit merges the storage data in each of the plurality of storage areas by alternately repeating, after executing a first holding processing for reading and holding a plurality of storage data equal to or more than a number of pieces of storage data used for comparison and determination of each storage area from each of the plurality of storage areas, an output processing for outputting a storage data having an order data indicating a highest priority among the plurality of held storage data and a second holding processing for reading and holding storage data from a head of a storage area in which the output storage data are held.

7. The information processing apparatus according to claim 5 further comprising
a merge range setting unit that sets at least one of a start value and an end value, the start value indicative of a highest priority of those indicated by the order data included in the storage data in each of the plurality of storage areas to be merged by the merging unit, the end value indicative of a lowest priority of those indicated by the order data included in the storage data in each of the plurality of storage areas to be merged by the merging unit,
wherein the merging unit determines, on the basis of the end value or the start value set by the merge range setting unit, a start position or an end position, from which storage data are read from a storage area, and reads storage data from a start position to a end position thus determined.

8. The information processing apparatus according to claim 7, wherein the merging unit determines the end position by using a binary search method for comparing order data included in a storage data at a center of a search range with the end value, and determines the start position by using the binary search method for comparing order data included in the storage data at the center of the search range with a start value.

9. The information processing apparatus according to claim 8, wherein the plurality of storage data used for the comparison and determination in each of the storage areas compared and determined by the comparing unit is denoted as n (an integer equal to or more than 1), and
when a number of pieces of storage data included in the search range of the binary search method becomes equal to or less than 2n−1, the merging unit adopts storage data at a head of the search range as the start position, or adopts storage data at a last of the search range as the end position.

10. The information processing apparatus according to claim 5, wherein the writing unit writes main the body data and order data in such a manner that main body data and order data are divided into the plurality of storage areas, and
the merging unit merges order data and thereafter sorts main body data in a same order as that of order data to merge storage data.

11. The information processing apparatus according to claim 5, wherein storage data or the reception data include a plurality of types of order data, and
the merging unit merges storage data on the basis of each of the plurality of types of order data.

12. The information processing apparatus according to claim 1 further comprising
a sort unit that holds the reception data received by the receiving unit, and intermittently sorts the reception data on the basis of the order data included in the held reception data,
wherein the comparing unit uses the reception data sorted by the sort unit.

13. The information processing apparatus according to claim 12, wherein the sort unit sorts the reception data at a predetermined interval of time.

14. The information processing apparatus according to claim 12, wherein when a number of the held reception data reaches a predetermined number of reception data, the sort unit sorts the held reception data.

15. The information processing apparatus according to claim 1 further comprising
an exception determining unit that determines whether the reception data received by the receiving unit meet an predetermined exception criterion,
wherein the comparing unit performs comparison and determination by using reception data that are determined not to meet the predetermined exception criterion by the exception determining unit.

16. The information processing apparatus according to claim 1 further comprising
an integrating unit that reads storage data held in a plurality of small storage areas in the plurality of storage areas when there are the plurality of small storage area holding storage data whose number is equal to or less than a predetermined number, sorts the read storage data in accordance with the order data included in the read storage data, and writes the read storage data to another storage area.

17. An information processing method comprising:
respectively receiving a plurality of storage data each including main body data and order data representing an order in which the main body data is processed;
determining whether or not to write reception data to one of a plurality of storage areas, the plurality of storage areas respectively holding the plurality of storage data including the main body data and the order data according to writing order of the storage data, on the basis of a result obtained by comparing the order data included in a last of the storage data held in the one of the plurality of storage areas with the order data included in the reception data; and
writing the reception data to the one of the plurality of storage areas as storage data when the reception data are determined to be written to the one of the plurality of storage areas.

18. The information processing method according to claim 17, wherein said determining whether or not to write the reception data, when the order data included in the reception data indicates a priority lower than or equal to a highest priority of those indicated by order data included in a plurality of storage data from the last of the storage data held in the one of the plurality of storage areas, determines to write the reception data to the one of the plurality of storage areas.

19. The information processing method according to claim 17, wherein said determining whether or not to write the reception data, when determining not to write the reception data to the one of the plurality of storage areas, determines, on the basis of a result obtained by comparing the order data included in the last of storage data held in another storage area with the order data included in the reception data, whether or not to write the reception data to said another storage area.

20. The information processing method according to claim 17 further comprising
adding a new storage area when determining to write the reception data to none of the plurality of storage areas,
wherein said writing writes the reception data to the new storage area.

21. The information processing method according to claim 17 further comprising
reading the storage data from each of the plurality of storage areas by sequential access and
merging the storage data in each of the plurality of storage areas on the basis of the order data included in each of the read storage data.

22. The information processing method according to claim 21, wherein said merging storage data merges storage data by alternately repeating, after executing a first holding step of reading and holding a number of pieces of storage data equal to or more than a number of pieces of storage data used for the comparison and determination of each storage area from each of the plurality of storage areas, an outputting process of outputting storage data having order data indicating a highest priority among the number of pieces of held storage data and a second holding process of reading and holding storage data from a head of storage area in which the output storage data are held.

23. The information processing method according to claim 21 further comprising
setting at least one of a start value and an end value, the start value indicative of a highest priority of those indicated by order data included in the storage data to be merged, the end value indicative of a lowest priority of those indicated by order data included in the storage data to be merged,
wherein said merging storage data determines, on the basis of the end value or the start value, a start position or an end position, from which storage data is read from storage area, and reads storage data from the start position to the end position thus determined.

24. The information processing method according to claim 23, wherein-said merging the storage data determines the end position by using a binary search method for comparing order data included in storage data at a center of a search range with the end value, and determines the start position by using the binary search method for comparing the order data included in the storage data at the center of the search range with the start value.

25. The information processing method according to claim 24, wherein a number pieces of storage data used for the comparison and determination in each of the storage areas compared and determined in the comparing step is denoted as n (an integer equal to or more than 1), and
when a number of pieces of storage data included in the search range of the binary search method becomes equal to or less than 2n−1, the merge step adopts storage data at a head of the search range as the start position, or adopts storage data at a last of the search range as the end position.

26. The information processing method according to claim 21, wherein-said writing writes main body data and order data in such a manner that main body data and order data are divided into the plurality of storage areas, and
said merging storage data merges order data and thereafter sorts main body data in a same order as that of order data to merge storage data.

27. The information processing method according to claim 21, wherein storage data or the reception data include a plurality of types of order data, and
said merging storage data merges storage data on the basis of each of the plurality of types of order data.

28. The information processing method according to claim 17 further comprising
holding the reception data received by the receiving step; and
intermittently sorting the reception data on the basis of the order data included in the held reception data,
wherein said determining whether or not to write the reception data uses the sorted reception data.

29. The information processing method according to claim 28, wherein said intermittently sorting the reception data sorts the reception data at a predetermined interval of time.

30. The information processing method according to claim 28, wherein when a number of the held reception data reaches a predetermined number of reception data, said intermittently-sorting the reception data sorts the number of held reception data.

31. The information processing method according to claim 17 further comprising
determining whether the reception data meet an predetermined exception criterion,
wherein said determining whether or not to write the reception data performs comparison and determination by using the reception data that are determined not to meet the predetermined exception criterion.

32. The information processing method according to claim 17 further comprising
reading storage data held in a plurality of small storage areas in the plurality of storage areas when there are the plurality of small storage areas holding storage data whose number is equal to or less than a predetermined number;
sorting the read storage data in accordance with the order data included in the read storage data; and
writing the read storage data to another storage area.

33. A non-transitory computer-readable storage medium storing a program for causing a computer to execute:
a receiving processing that respectively receives a plurality of storage data each including main body data and order data representing an order in which main body data is processed;
a comparing processing that determines whether or not to write reception data to one of a plurality of storage areas, the plurality of storage areas respectively holding storage data including main body data and order data according to a writing order of the plurality of storage data, on the basis of a result obtained by comparing order data included in a last of the storage data held in the one of the plurality of storage areas with order data included in the reception data received by the receiving processing; and a writing processing that writes the reception data to the one of the plurality of storage areas as storage data when the reception data are determined to be written to the one of the plurality of storage areas in the comparing processing.

\* \* \* \* \*